June 22, 1965 M. HINDEN 3,190,250
SHEET METAL TOOL
Filed March 5, 1963
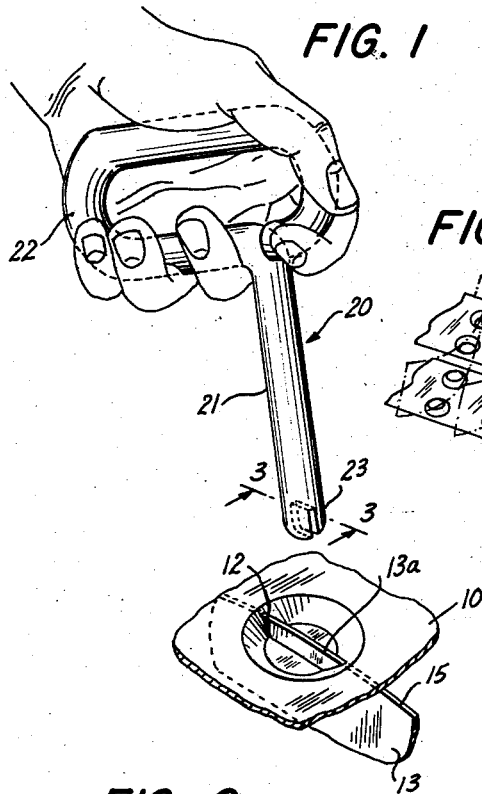
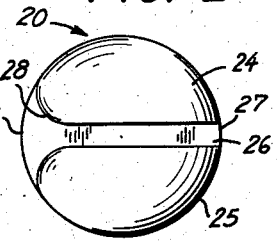
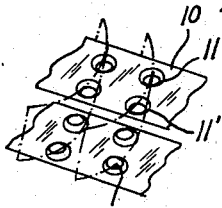
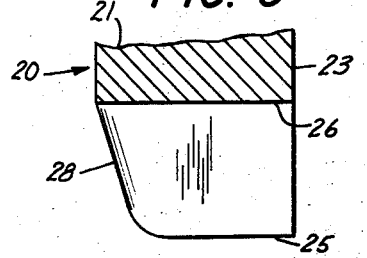
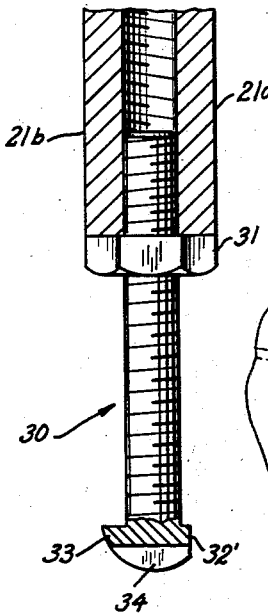
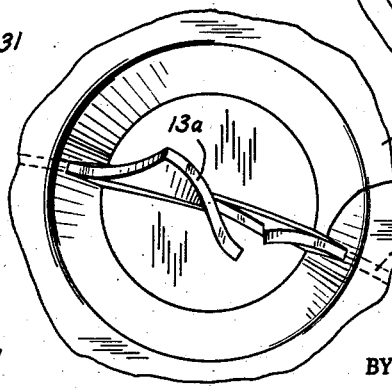
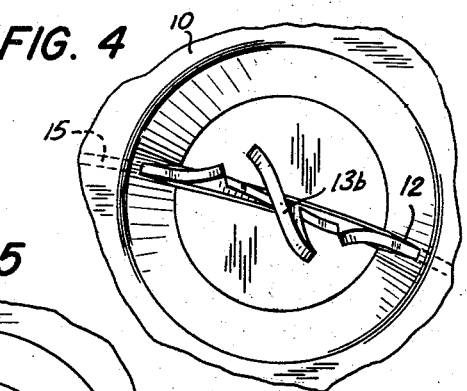
INVENTOR.
MILTON HINDEN
BY *Mark Basseches*
ATTORNEY

United States Patent Office 3,190,250
Patented June 22, 1965

3,190,250
SHEET METAL TOOL
Milton Hinden, 15 Bay Link, Massapequa, N.Y.
Filed Mar. 5, 1963, Ser. No. 262,959
2 Claims. (Cl. 113—1)

This invention relates to a tool for deforming sheet metal, and more particularly to a blade assembly tool for locking a sheet metal air turning blade to a blade rail.

Still more particularly, this invention relates to a tool for use in fabricating an air guide device comprising sheet metal air turning blades mounted between spaced parallel blade supporting rails.

Still more particularly, this invention relates to a tool for fabricating an air guide device substantially of the type shown in United States Patent No. 2,861,597. In accordance with known practice, as exemplified by said patent, air turning devices comprising a plurality of curved blades of either single or double layered construction are mounted between spaced blade supports. In accordance with the aforesaid patent, the blade supports include spaced protuberances struck inwardly from the generally planar supports, which protuberances are intersected by angularly disposed slots. The individual blades are affixed to the blade supports by passing the sheet metal of the blade through the slots and by distorting the portion of the blade which extends through the slots.

In the past it has been customary to effect the distortion aforesaid by slitting the extending blade portions as by either using tin shears or the like, or by the use of a chisel. The slitted blade portions are then folded against the outer surface of the blade supports, to draw the blades against the inner surface of the blade supports. Normally each blade is secured at two points to each of the blade supports. The spaced blade supports, with the blades secured therebetween, form an air turning unit which may be disposed within the duct of a heating system, for example, to guide air smoothly around bends in the system.

The operation of affixing the blades to the rails has proven tedious and time consuming. Where a chisel is used to effect slitting and the tabs thus formed substantially bent, undesired deformation of the rail itself, as opposed to the blade, has often resulted. Similarly, where tin snips are employed and the flaps thus formed folded over, looseness in the joint often results. Such looseness, when air is passed across the air guide, may result in a relative movement of the blades with respect to the rails, and a consequent annoying rattling of these parts.

Accordingly, it is an object of this invention to provide a tool which is inexpensive and which, in a single operation, effectively locks the blade to the blade support rail, thus eliminating the necessity for separate slitting and bending steps.

A further object of the invention is to provide a tool for locking a blade to a blade rail wherein a firm connection is assured and whereby relative movement between the assembled parts is prevented.

To attain these objects and such further objects as may appear herein or be hereinafter pointed out, reference is made to the accompanying drawing, forming a part hereof, in which FIGURE 1 is a perspective view of the tool and a portion of an air guide assembly prior to manipulation;

FIGURE 2 is a magnified bottom view of the tool of FIGURE 1;

FIGURE 3 is a magnified section taken on the line 3—3 of FIGURE 1;

FIGURE 4 is a plan view of a completed joint between the blade and blade support as effected through the use of one form of tool;

FIGURE 5 is a view similar to FIGURE 4, showing the joint formed by the use of the preferred tool embodiment;

FIGURE 6 is a magnified section of an embodiment of the tool;

FIGURE 7 is a fragmentary perspective view of an air guide device resulting from the use of the tool.

In customary practice, a fabricator or installer is provided with stock blade rail material for the formation of air guides. The stock material comprises extended lengths of sheeted metal 10, formed with dimples or protuberances 11. The dimples or protuberances are provided with transverse slots 12, it being understood that an air guide device is formed by severing the desired lengths of stock material and disposing generally rectangular metal blades 13 within the slots 12 of adjacent pairs of protuberances 11, 11.

In order to seat the sheet metal blades 13 within the protuberances, the blades are manually curved to conform with the angles of the slots 12. Once the blade is seated within the slots, the portion 13a which projects through the slots is deformed so as to prevent the portion 13a from passing back through the slot, the deformation preferably drawing the upper marginal edge 15 of the blades tightly against the inner surface of the blade rail 10.

It is with a tool for deforming the extending portion 13a that the present invention is concerned.

The tool 20 comprises a shank portion 21, which may be generally cylindrical in cross section, a lever handle 22 being formed or affixed at one end of the shank portion. The opposite end 23 of the shank is bifurcated to provide opposed portions 24, 25, defining a central slot 26 therebetween. The slot 26 is preferably formed in such manner that one extremity 27 of the slot is disposed further from the longitudinal axis of the shank 21 than the other extremity 28 of said slot. The end portion 23 of the shank, as best shown in FIGURE 3, is preferably tapered or rounded so as, in a measure, to be self-centering by engagement with the side walls of the protuberances 11 when inserted therein.

In operation, after a blade 13 has been mounted within the slot 12 of a protuberance 11, to expose a portion 13a to the outside of the blade rail, the slot 26 of the tool 20 is sleeved over the projecting portion of the blade. Downward pressure is exerted by the tool against the blade rail 10 to cause the upper margin 15 of the blade to be firmly pressed against the undersurface of the rail 10. While such pressure is being exerted, a twisting force is applied to the tool 20 through the leverage handle 22. As a result of the operations aforesaid, the projecting portion 13a is deformed, said deformation being characterized by a splitting of the portion of the blade 13a which lies adjacent the end 28 of the slot 26.

A properly formed joint is shown in FIGURE 5.

As will be seen from said figure, the use of the tool normally results in a diagonal break or cut being formed in the portion 13a, said break or cut portion being turned out of registry with the remainder of the blade by the rotary force applied through the tool. The cut runs diagonally toward the base of the depression 11 and thus firmly locks the blade to the rail.

In FIGURE 4 there is shown a joint which is formed through the use of a slotted tool substantially in accordance with the tool of FIGURE 1, the sole difference being that the ends of the slot engaging the portion 13a are equidistant from the axis of rotation of the tool.

It will be observed from FIGURE 4 that whereas the joint therein shown is satisfactory for some purposes, it is not as acceptable as the joint of FIGURE 5. The disadvantage of the joint of FIGURE 4 arises from the fact that the tab 13b therein shown has been severed from the blade along two lines rather than along only one line, as shown in FIGURE 5. As a result, the tab may be considerably weakened, and unless care is taken, may result in a complete separation of the holding portion 13a, with a consequent compromising of the anchorage of the blade and blade rail support.

Unobviously, the eccentric slot shown in FIGURE 2 and the embodiment of FIGURE 6, next to be described, results in the formation of only a single cut in the blade and unless the tool is manifestly misused, a strong joint is formed.

In the embodiment of FIGURE 6, wherein like parts have been given like reference numerals, the tool shank 21a incorporates a threaded internal aperture 21b. A round headed bolt 30 is threaded within the aperture 21b, a lock nut 31 serving to secure the bolt 30 to the shank 21a without permitting relative rotation of these parts.

In the preferred form of the embodiment of FIGURE 6, a portion 32' of the head 33 of the bolt 30 is ground away, leaving a flat portion intersecting the usual turn slot 34. From the foregoing, it will be recognized that the slot 34 is placed over the projecting portion 13a of the blade and the shank 21a rotated. As the prior embodiment, the portion 13a is deformed substantially as shown in FIGURE 5, resulting in a solid union between the blade and the blade rail.

It will be readily recognized that the herein described method of affixing blades to blade rails permits the assembly of the rails and the blades in advance of deformation of the portions 13a. Systems heretofore used were not entirely conducive to such preassembly, since in many instances the use of chisels or tin snips required manipulation of the preassembled unit, often resulting in the disarrangement of the components from their preassembled relationship.

Having thus described the invention and illustrated its use, what is claimed as new and is desired to be secured by Letters Patent is:

1. A tool for deforming a portion of a sheet metal air turning blade disposed within a dished portion formed on the outer surface of a blade rail comprising an extended shank portion, a handle lever formed at one end of said shank portion and a blade forming portion at the other end of said shank portion, said blade forming portion comprising spaced apart jaws defining therebetween a slot extending across said other end in the direction of the longitudinal axis of said shank, the opposed lateral terminal portions of both said jaws to one side of said axis being disposed further from said axis than the opposed lateral terminal portions of said jaws to the other side of said axis, said slot extending further to one side of said axis than to the other side of said axis.

2. A tool in accordance with claim 1 wherein the other end of said shank portion is outwardly rounded to be generally convex in conformation.

References Cited by the Examiner
UNITED STATES PATENTS
2,513,792   7/50   Forster _____ 29—240.5

CHARLES W. LANHAM, *Primary Examiner.*